May 28, 1935.　　M. P. LAURENT　　2,002,780
GATE VALVE
Filed Oct. 4, 1930　　2 Sheets-Sheet 1
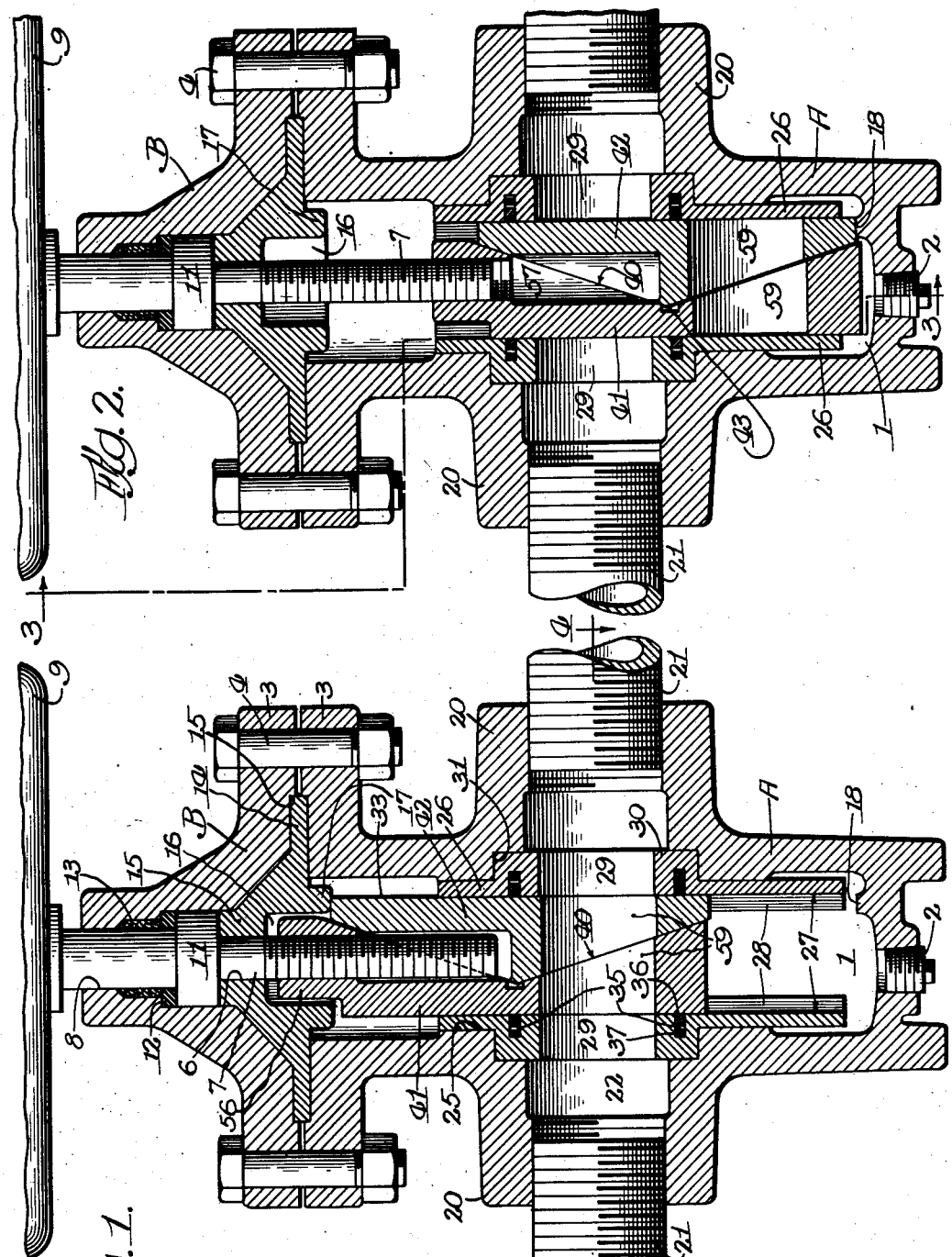

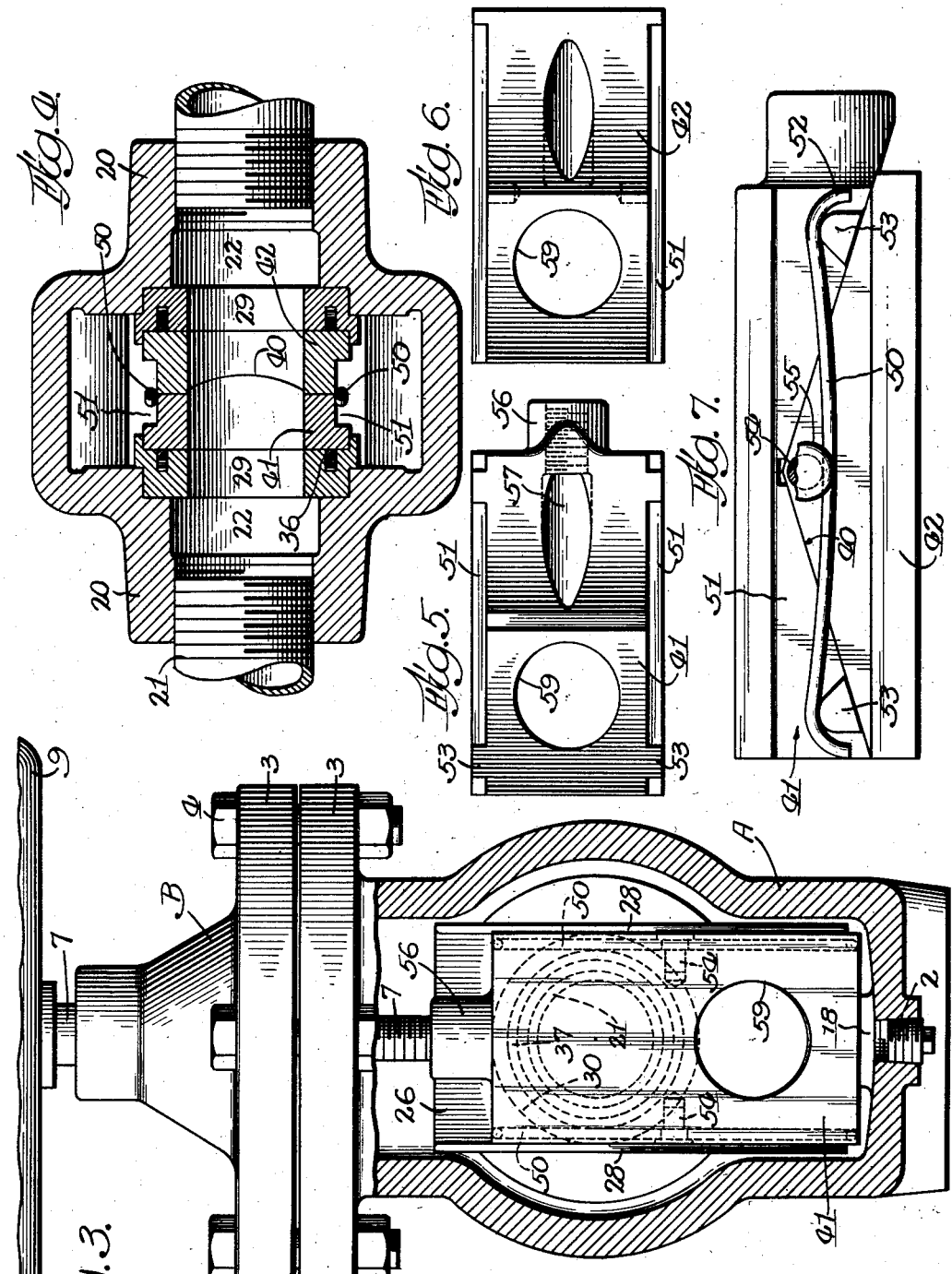

Patented May 28, 1935

2,002,780

UNITED STATES PATENT OFFICE 2,002,780

GATE VALVE

Milton P. Laurent, Houston, Tex., assignor to W-K-M Company, Inc., Houston, Tex., a corporation of Texas Application October 4, 1930, Serial No. 486,383

1 Claim. (Cl. 251—68)

REISSUED

My invention relates to improvements in gate valves designed more particularly for use in connection with conduits or pipe lines carrying fluid, such as oil, under high pressures.

The principal object of my invention is to provide a valve mechanism of this character, capable of withstanding high pressure and of such construction that when the gates are in open or closed or intermediate positions, the pressure of the liquid or substance being controlled by the valve will be retained within the valve parts and gate parts, and the interior of the body of the valve will be maintained free from fluid and pressure.

Another object of the invention is to eliminate trouble and interference with the free operation of said valve by the provision of a construction in which there are no pockets or openings for the reception of foreign matter, the structure being such as to provide a straightway sealed passage for the fluid through the valve and to prevent leakage of the fluid beyond said passage into the interior of the valve housing.

Another object is to provide an improved valve of a construction in which ready access to the interior of the valve in any position of the gates may be obtained, whereby complete accessibility is provided for the removal and replacement of the gates and parts under emergency conditions well known in the industry.

Other objects of the invention will appear hereinafter.

Referring to the accompanying drawings, in which is illustrated one embodiment of my invention, Fig. 1 is a vertical, central, longitudinal section through the valve structure, showing the gates in open position;

Fig. 2 is a similar section, showing the gates in closed position;

Fig. 3 is a transverse vertical section, substantially on the line 3—3 of Fig. 2;

Fig. 4 is a horizontal section, substantially on the line 4—4 of Fig. 1;

Figs. 5 and 6 are detailed views of the gate members; and

Fig. 7 is a view in elevation, showing said gate members in assembled relation.

The body housing A of the valve is preferably formed of a suitable casting within which a chamber 1 is formed for containing the operating parts of the valve. The lower end and sides of this chamber are closed by the wall of the housing, except for the provision of a drain plug 2 from which any accumulations, such as water of condensation, may be withdrawn whenever desired.

The upper end of the chamber is closed by a removable bonnet B, both the bonnet B and the body A having annular flanges 3 through which the clamping bolts 4 extend for fastening the bonnet to the body. This makes the bonnet readily removable from the body housing simply by the removal of the clamping bolts 4. The removal of the bonnet permits complete access directly to the valve chamber 1.

A conical-shaped valve stem guide 5 is provided, having a central opening 6 constituting a bearing for the valve operating stem 7. This valve stem extends upwardly through another bearing opening 8 in the upper end of the bonnet, and its upper end, exterior of the valve body, is provided with a suitable hand-wheel 9, by which the stem may be rotated to operate the gates.

The valve stem has a collar 11 within a recess in the bonnet and this collar bears against the upper end of the valve guide member 5 to take the thrust on the valve stem incident to the movement of the gates in one direction, and a shoulder 12 in said recess takes the thrust on the valve stem incident to the operation of the gates in the opposite direction. Suitable packing 13 is provided around the valve stem in said recess between the collar 5 and the bonnet.

The valve stem guide member 5 is held in place by being clamped between the bonnet and the housing, this member being provided with an annular flange 14 of sufficient diameter to provide a substantial clamping surface between the bonnet and housing flanges. Annular recesses 15 are provided in the opposing faces of said flanges for the reception of the flange 14, so that when the valve is assembled the valve guide member will always be properly centered.

The valve stem guide member 5, on its under surface, is provided with a central recess 16 for the reception of the upper end of the valve gate mechanism, hereinafter described, and surrounding this recess is a depending flange 17 which serves as an abutment stop for the upper end of the gate mechanism to bring about the expanding operation thereof. In like manner, the lower wall of the valve housing, on its interior, has an upstanding projection 18, which serves a like purpose in expanding the gate mechanism.

The opposite exterior walls of the housing have outstanding bosses 20 which are threaded for connection with pipe or conduit 21 in the usual manner. These bosses are aligned with each other and form ports 22 opening into the interior chamber 1 of the housing, the axes of these ports being at right angles to the plane of movement of the gate mechanism.

The interior chamber 1 of the housing is elongated vertically to accommodate the range of movement of the gate mechanism. The opposed inner walls of the chamber 1 have faces 25 accurately machined in parallel relation to each other, the planes of these faces being at right angles to the axes of the ports. These faces serve as seats for the guide members 26 for the movable mechanism. The guide members are vertically disposed and have flat guide faces 27 which are accurately machined and are in exact parallel relation to each other. These guide members also have flanges 28 along their edges on each side, which, together with said guide faces 27, form channels for accurately guiding the movable gate mechanism and constitute seats therefor. The guide members have ports 29 opening therethrough and axially aligned with each other and with the ports 22 in the housing, so as to form a straightway passage through the entire valve for the fluid.

The guide members are provided with integral annular offset portions 30 which are concentric with the ports 29 and which are seated in corresponding annular recesses 31 in the faces 25 of the housing walls. These offsets are accurately fitted in the recesses so that the guideways are capable of rotary movement on an axis corresponding to the axis of the ports. This construction renders the guide members self-aligning with respect to the movement of the gate mechanism. The guide members are held in place in their recesses by the movable gate mechanism, and are constructed as separate members so that they may be readily and economically replaced when they have become worn. They are accurately fitted in their seats and thereby prevent any leakage from the ports to the interior chamber 1 of the housing.

The gate mechanism comprises two elongated blocks 41 and 42, having their outer faces and edges 33 accurately machined so that they will slide in the channel seats formed in the guide members 17. Although these surfaces are accurately fitted so as to prevent leakage from the fluid ports and passages to the interior chamber of the valve housing, I also provide for further insurance against such leakage. Each guide member has a deep annular recess 35, concentrically disposed with respect to the ports 29, and containing sealing rings 36 which are yieldably urged into contact with the surfaces of the gate mechanism by springs 37 positioned between the rings and the bottom of said recesses. This maintains a tight joint which is adaptable to any wear that may occur in these surfaces.

The meeting or abutting faces 40 of the two gate blocks 41 and 42 are angularly disposed with respect to the line of movement of the gates to form surfaces which provide a wedging action when the two gate blocks are moved longitudinally relatively to each other, for the purpose of expanding the gate mechanism against the guide members. In order to make this wedging action positive in both directions of movement of the gate 41 relatively to gate 42, these abutting angular faces diverge in both directions from a middle point 43. This arrangement forms a double wedge which is positive acting in either direction of movement of gate block 41 relatively to block 42.

The two gate blocks are assembled together as a unit and are movable as a unit in their guides, except when they are given a relative movement to expand them against their seat faces. The gate blocks are held in this unitary relation by means of the spring members 50, Fig. 7, one of these springs being disposed at each side face of the gate block. The side faces, as shown in Fig. 4, are channeled out, as at 51, to accommodate the springs 50. The springs are curved at their ends 52 and are hooked over lugs 53 formed on the side face of gate block 41 adjacent each end thereof. The springs are flexed and the central portions thereof are sprung under lugs 54 formed at the center of the side faces of the other gate block 42, these latter lugs 54 having flanged heads 55 to prevent the springs from becoming accidentally detached. The action of these springs is to yieldingly hold the gate members together with their angular wedging faces in contact and to return the two members into this relation when the gate is relieved of expanding force during the travel of the gate unit from closed to open position and vice versa.

The gate member 41 has a threaded boss 56 at its end, through which the lower end portion of the operating stem is threaded and which travels along the threaded end portion of the stem to reciprocate the gate mechanism longitudinally to open or closed or intermediate position when the stem is rotated. Within the interior of the gate mechanism unit is a socket 57 of sufficient length to accommodate the end portion of the stem, this socket being aligned with the threaded opening in the boss 56. The socket 57, as clearly shown in Figs. 1 and 2, intersects the angular wedging faces of the two gate members, but the socket is sufficiently large in diameter so as not to interfere with the relative shift of the gate members. The upper position of the gate mechanism, as shown in Fig. 1, corresponds to the open condition of the valve, and both gate members are provided with aligned ports 59 which are brought into alignment with the ports 22 and 29 of the housing when the gate unit is in the upper position. In the lower position, as shown in Fig. 2, the gate ports are, of course, carried out of alignment with the ports in the body to close the valve.

As the gate unit approaches the upper or lower position, the stop 17 or 18 is engaged by the upper or lower end, respectively, of the gate member 42, and holds this gate member against further longitudinal movement. The stem, however, continues to move the gate member 41 slightly relatively to gate member 42, and causes it to ride on the respective wedging surfaces. The expanding action of the gate unit thus caused forces the faces of the gate members tightly against their seats on the guide members and compresses the guide members tightly against the housing wall faces 25, thus rendering it impossible for any fluid to reach the interior of the chamber 1. A slight reverse rotation of the valve stem releases the expanding pressure of the gate mechanism and enables the gate mechanism to be shifted to any other position. It will be noted that the mechanism is self-cleaning by reason of the fact that any accumulation of grit or fluid on the valve seats or faces is scraped off each time the valve is operated.

While I have herein shown and described what I consider the preferred manner of carrying out my invention, the same is merely illustrative, and I contemplate any changes and modifications that may come within the scope of the claim appended hereto.

I claim:

In a valve of the class described, the combination of a valve housing having aligned ports and an interior chamber, parallel valve seats in said housing, a gate valve mechanism having a port for registration with said housing ports and slidable on the seats to move its port into or out of registration, said valve mechanism including two members having outer parallel faces abutting said seats and having inner abutting faces in angular relation to provide a wedge-like action when the members are shifted relatively to each other to expand the gate mechanism with respect to the valve seats, means for sliding the gate mechanism on said seats, means for shifting the members of said gate mechanism relatively longitudinally to each other on their inner abutting faces, means for maintaining said members with their inner abutting faces in contact during the sliding movement of the gate mechanism said means including spring clips disposed at the sides of said gate mechanism and lugs on said gate mechanism engaged by said spring clips, to prevent leakage of fluid between the said members of the gate mechanism, and spring actuated sealing rings in said seats surrounding the ports and yieldingly bearing against the parallel outer faces of the members of the gate mechanism to prevent leakage of fluid between said gate mechanism and the seats.

MILTON P. LAURENT.